United States Patent [19]

Sekizawa et al.

[11] Patent Number: 5,410,651
[45] Date of Patent: Apr. 25, 1995

[54] PROGRAM LOADING METHOD AND SYSTEM FOR DISTRIBUTED PROCESSING SYSTEM

[75] Inventors: Toshihiko Sekizawa, Katsuta; Kinji Mori, Yokohama; Yasuo Suzuki, Ebina; Masayuki Orimo; Katsumi Kawano, both of Kawasaki; Minoru Koizumo, Yokohama; Kozo Nakai, Katsuta; Hirokazu Kasashima, Hitachi, all of Japan

[73] Assignee: Hitachi, Ltd., Tokyo, Japan

[21] Appl. No.: 31,923

[22] Filed: Mar. 16, 1993

Related U.S. Application Data

[63] Continuation of Ser. No. 301,489, Jan. 26, 1989, abandoned.

[30] Foreign Application Priority Data

Jan. 29, 1988 [JP] Japan .................................. 63-17063

[51] Int. Cl.$^6$ ............................................ G06F 13/00
[52] U.S. Cl. ..................................... 395/200; 395/650; 364/DIG. 1; 364/264; 364/281; 364/284; 364/284.3
[58] Field of Search ................. 395/200; 364/DIG. 1, 364/281, 284.3

[56] References Cited

U.S. PATENT DOCUMENTS

| | | | |
|---|---|---|---|
| 4,633,387 | 12/1986 | Hartung et al. | |
| 4,752,870 | 6/1988 | Matsumura | 364/200 |
| 4,785,397 | 11/1988 | Koizumi et al. | 364/200 |
| 4,839,798 | 6/1989 | Eguchi et al. | 364/200 |
| 4,888,683 | 12/1989 | Koizumi et al. | 364/200 |

FOREIGN PATENT DOCUMENTS

146361 of 1982 Japan.
230260 of 1985 Japan.
285569 of 1986 Japan.
115556 of 1987 Japan.

Primary Examiner—Kevin A. Kriess
Assistant Examiner—Kakali Chaki
Attorney, Agent, or Firm—Antonelli, Terry, Stout & Kraus

[57] ABSTRACT

In a distributed processing system wherein a plurality of processors are connected through a network and wherein programs are transmitted among the processors; each of the processors monitors the status of a program in the processor or the load status of any other of the processors as indicated by a message on the network. Upon performance of a judgement operator, the processor broadcasts a message indicative of the status of the processor or a program with a content indicating code affixed thereto, to another network, and the processor having received the message broadcasts a program existent in the other processor to the network along with the code indicative of the content of the program. The broadcast is performed in the other processor in accordance with the load statuses of the processors, and upon judging the content of the received message. Each processor judges whether or not the program being broadcast corresponds to a function necessary for a process of the processor based on the code indicative of the content of the program. If the program is needed, the processor loads and executes the program.

9 Claims, 7 Drawing Sheets

PROGRAM LOADING METHOD AND SYSTEM FOR DISTRIBUTED PROCESSING SYSTEM

This application is a continuation application of Ser. No. 07/301,489, filed Jan. 26, 1989, now abandoned.

BACKGROUND OF THE INVENTION

1. Field of the Invention

The present invention relates, in a distributed processing system wherein programs can be transmitted under an online environment among processors which are connected through a network, to a program loading method and system in which each of the processors loads the program from the network in accordance with the status of a program in the processor.

2. Description of the Prior Art

Heretofore, in a distributed system which is constructed of a plurality of processors connected through a network, there has been considered a method wherein, when the system or the processors starts/start, programs are transmitted among the processors under an online environment, and the processors load the programs peculiarly required therefor. However, there has not been considered a method in which each of the processors loads the program in accordance with its own status.

Prior-art techniques as stated above are described in the official gazettes of Japanese Patent Applications Laid-open No. 146361/1982, No. 285569/1986, No. 230260/1985 and No. 115556/1987.

The prior-art techniques do not take it into consideration that each processor copes with a program failure, an overload or underload for the processor, etc. Once the failure of any program has occurred, it becomes impossible to continue a process executed by the program, and a series of processes including the process cannot be executed. In this regard, in a case where the process is executed by a plurality of identical programs, there has been the problem that, each time the program failure occurs, a lowering of the reliability of the process is incurred. Moreover, even when a specified one of the processors undergoes a concentrated load, each processor cannot cope with the situation at all, and there has been the problem that the rapidity of a series of processes is reduced.

SUMMARY OF THE INVENTION

An object of the present invention is to provide a program loading method and system in which each processor loads a program from a network in accordance with the status of a program in the processor.

To accomplish the above object, the present invention provides, in a distributed processing system wherein a plurality of processors are connected through a network and wherein programs are transmitted among the processors, that each of said processors monitors a program in the processor and broadcasts a message indicative of a status of its program to the network upon peculiarly judging from a status of the monitored program, and that any of the processors having received the message broadcasts a specified program of the processor to the network upon peculiarly judging from a content of the message. In addition, each of the processors judges load conditions of the other processors on the basis of the messages on the network, and if necessary, broadcasts a specific required program of its own to said network.

The foregoing and other objects, advantages, manner of operation and novel features of the present invention will be understood from the following detailed description when read in connection with the accompanying drawings.

DETAILED DESCRIPTION OF THE PREFERRED EMBODIMENTS

As stated above, according to the present invention, each of the processors autonomously broadcasts a message indicative of its status to the network, and the processor having received the message broadcasts a program of its own to the network upon peculiarly judging from the message, so that the processor requiring the program may load and execute it. Therefore, each processor is permitted to peculiarly cope with the status of the program in the processor, such as the occurrence of any abnormality of the program in the processor or an overload or underload.

Figure 2:
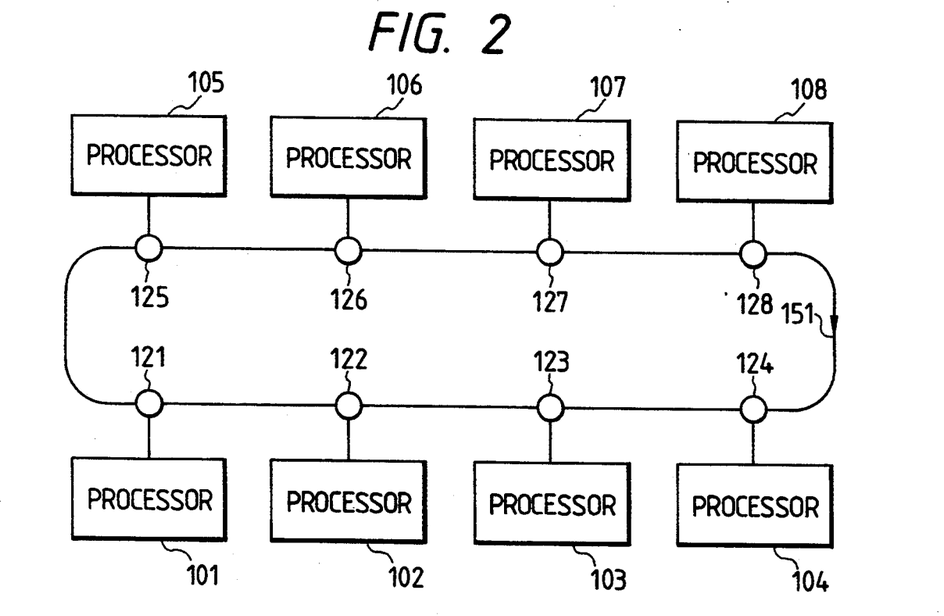
FIG. 2 is an arrangement diagram of the whole system.

Now, the present invention will be described in detail in conjunction with embodiments. FIG. 2 shows the whole arrangement of a system to which the method of the present invention is applied. Although the ensuing embodiments will be elucidated as to only a single loop transmission system connecting respective processors, the same processing proceeds even in case of employing any ordinary network.

Referring to FIG. 2, numerals 101-108 indicate processors each of which stores application programs in an internal memory and executes them, and numeral 151 indicates a unidirectional loop transmission path which transmits data in the direction of an arrow. Numerals 121-128 denote network control processors (NCPs) which perform data transmission controls on the transmission path. Each of the NCPs 121-128 and the corresponding one of the processors 101-108 are connected by a bidirectional transmission path. Messages from the processors 101-108 are broadcast onto the transmission path 151 via the respective NCPs 121-128. Each of the NCPs 121-128 judges if the message flowing on the transmission path 151 is necessary for the corresponding one of the processors 101-108 connected therewith, and it sends the data of the message to the connected one of the processors 101-108 only when it judges the necessity. Each of the processors 101-108 starts the application program stored therein when all data required for the execution of the program have become complete. The started program executes its own process by the use of the data, and outputs the result of the process. On the other hand, in a case where each of the processors 101-108 has received a program from network it stores the program in the internal memory.

Figure 3:
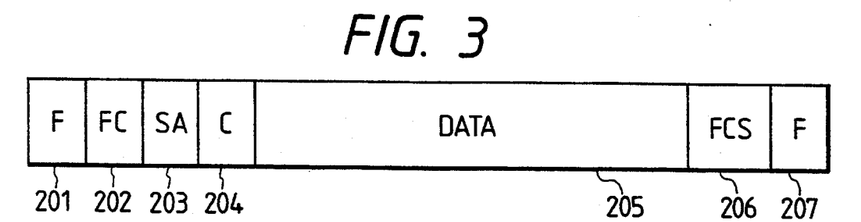
FIG. 3 is a format diagram of a message which flows through a transmission path in FIG. 2.

FIG. 3 shows the format of the message which flows on the transmission path 151. F 201 and F 207 are flags which indicate the start and end of the message, respectively. FC 202 is a function code, which corresponds to the content or function of the message. On the basis of this function code FC 202, each of the NCPs 121-128 judges whether or not the corresponding one of the processors 101-108 connected thereto requires the received message. SA 203 indicates the address (sender address) of the NCP having sent the message, and C 204 a serial number needed for the transmission. DATA 205 is data which indicates the content of the processed result of each application program or the content of the application program, and FCS 206 is frame check sequence data.

Figure 4:
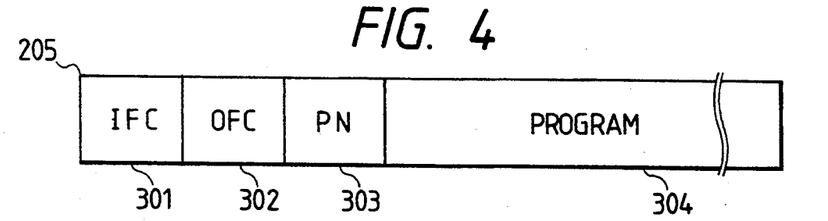
FIG. 4 is a format diagram of a data portion in the case where the content of the message is a program.

FIG. 4 shows the format of the data portion DATA 205 in the case where the data portion of the message denotes the content of the program. The function code FC 202 of the message on this occasion indicates the content of the program together with the fact that the content of the message is a program. IFC 301 indicates the function code (input FC) of data which the program inputs, OFC 302 the function code (output FC) of data which the program outputs, PN 303 a program name, and PROGRAM 304 the content of the program.

Figure 5:
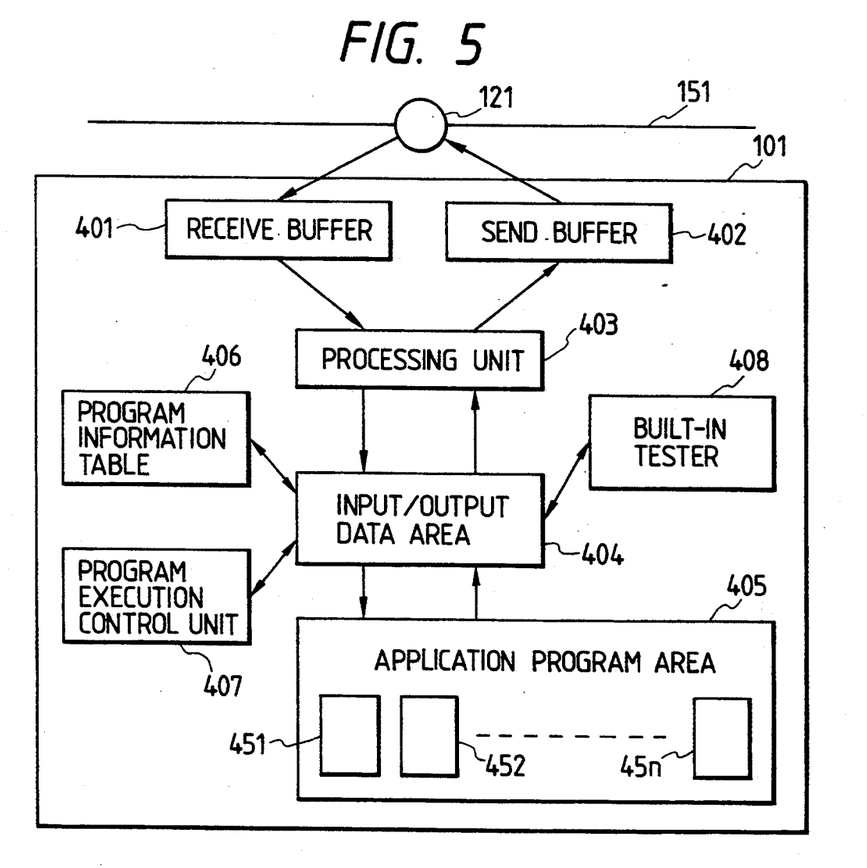
FIG. 5 is a diagram of the internal architecture of a processor.

FIG. 5 shows the internal architecture of the processor 101 (to which the internal architecture of each of the processors 102-108 is identical). When a message flowing on the transmission path 151 is accepted by the NCP 121, it is stored in a receive buffer 401. The data latched in the receive buffer 401 is sent to an input/output data area 404 by a processing unit 403. A program execution control unit 407 judges whether or not the content of the message is a program, from the function code 202 of the accepted message. If the message content is not any program, the application program which can be started by the message is sought by retrieving a program information table 406. In the presence of the executable application program, this program is started by the accepted message. On the other hand, if the content of the accepted message is any program, the program execution control unit 407 examines the data portion DATA 205 of the message, and it stores the input function code IFC 301, output function code OFC 302, program name PN 303, and function code FC 202 affixed to the message in the program information table 406 and also stores the program PROGRAM 304 in an application program area 405. A built-in tester 408 monitors the statuses of the application programs 451-45n which are stored in the application program area 405. When a fault of the program has been detected or the load of the processor is too light by way of example, the built-in tester 408 broadcasts a message indicative of the status of the corresponding processor (a status message) onto the transmission path 151 through the processing unit 403, a send buffer 402 and the NCP 121 upon its own judgement. The result of a process based on the application program is stored in the input/output data area 404, is sent to the send buffer 402 by the processing unit 403 and is caused to flow to the transmission path 151 via the NCP 121.

Figure 6:
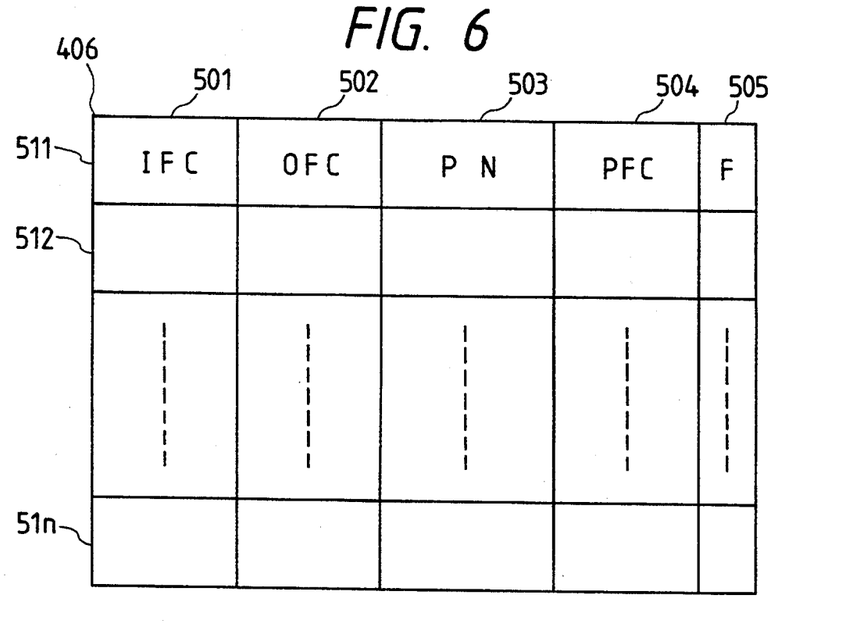
FIG. 6 is a format diagram of a program information table in FIG. 5.

FIG. 6 shows the format of the program information table 406. In the table, information items corresponding to the application programs within the processor are stored. IFC 501 is an input function code, OFC 502 is an output function code, PN 503 is a program name, and PFC 504 is a function code (program FC) which is affixed when the corresponding program is caused to flow onto the transmission path 151. F 505 is an "executable" flag, which is set in a case where the corresponding program is executable. This table is such that rows 511-51n correspond to the application programs 451-45n.

Figure 7:
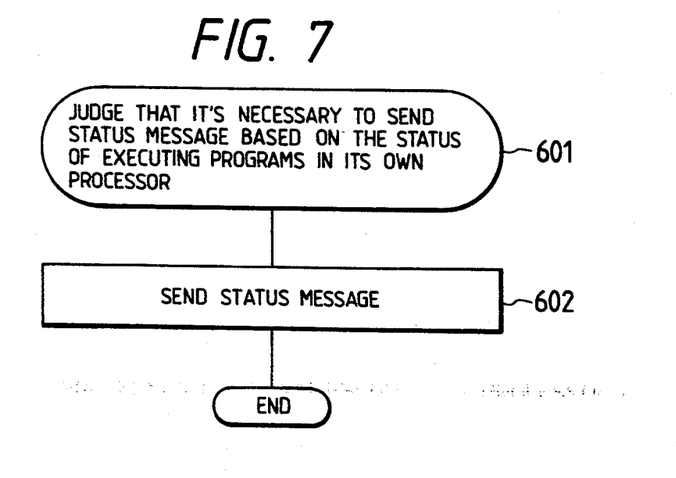
FIG. 7 is a flow chart showing the processing steps of a built-in tester which has judged a program loaded from a network.

FIG. 7 shows processing steps in the case where the built-in tester 408 judges it necessary to send the status message, from the status of the program in the processor. Upon judging it necessary to send the status message, from the status of the program in the processor (step 601), the built-in tester 408 causes the status message to flow onto the transmission path 151 (step 602). The function code FC 202 of the status message indicates that the message is the status message, and the data content DATA 205 thereof indicates the status of the corresponding processor.

Figure 8:
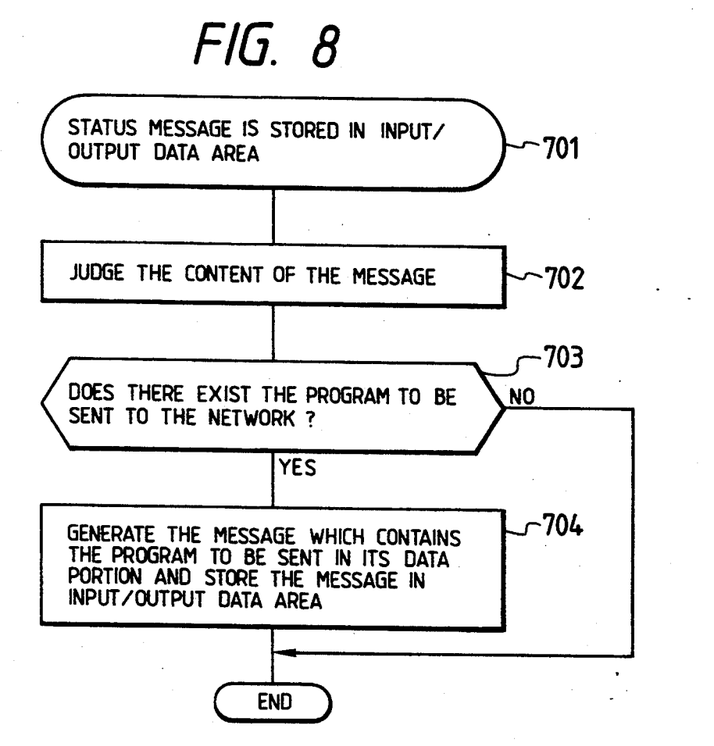
FIG. 8 is a flow chart showing the processing steps of the program execution control function of the processor which has received a program request message.

FIG. 8 shows the processing steps of the program execution control unit 407 in the processor which has received the status message. When the status message has been accepted by the processor and has reached the input/output data area 404 (step 701), the program execution control unit 407 reads the data portion of the message (step 702), to obtain information on the status of the processor which is the sender of the message. The program execution control unit 407 having obtained the information retrieves the program information table 406 and examines if a program to be transmitted exists in the application program area 405, on the basis of the content of the message (step 703). In the absence of the program to be transmitted, a series of processes are ended at that time. In the presence of the program to be transmitted, this program is copied from the application program area 405 to the input/output data area 404, and there is generated a message in which the data portion containing the pertinent program is given by the format shown in FIG. 4 and the function code of which is the program function code PFC 504 of the program to-be-transmitted as registered in the program information table 406 (step 704). The message generated as described above is sent to the send buffer 402 by the processing unit 403, and is caused to flow through the transmission path 151 via the NCP 121.

Figure 9:
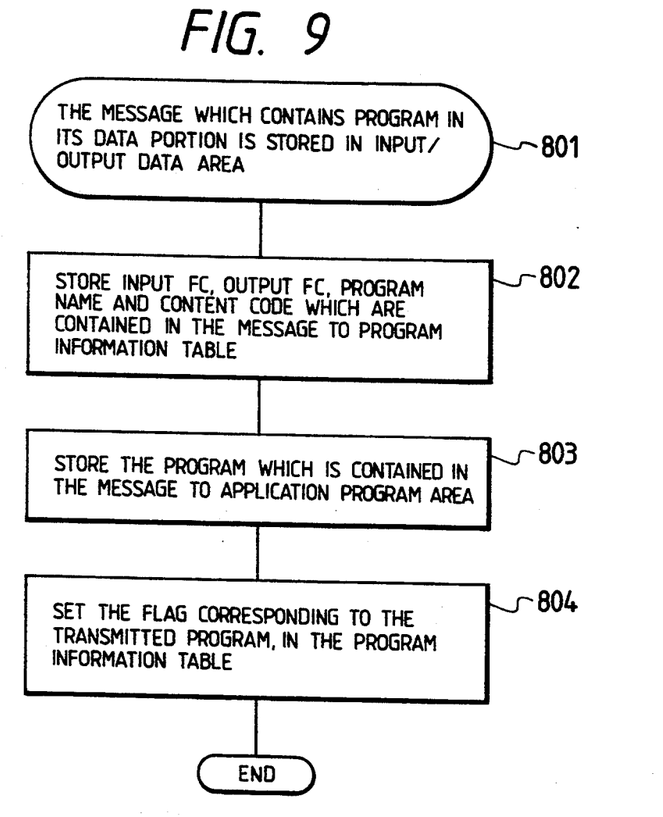
FIG. 9 is a flow chart showing the processing steps of the program execution control function of the processor which has received a message containing a program.

FIG. 9 shows the processing steps of the program execution control unit 407 in the processor having the message whose data portion DATA 205 is the program. When the message has reached the input/output data area 404 (step 801), the input function code IFC 301, output function code OFC 302 and program name PN 303 in the data portion DATA 205 whose format is shown in FIG. 4, and the function code of the message are respectively stored in the IFC 501, OFC 502, PN 503 and PFC 504 in the empty areas of the program information table 406 (step 802). Besides, the content of the PROGRAM 304 is stored in the application program area 405 (step 803). When the storing operations have been completed, the "executable" flag F 505 at the row corresponding to the received program in the program information table 406 is set to start the execution of the program.

Figure 1:
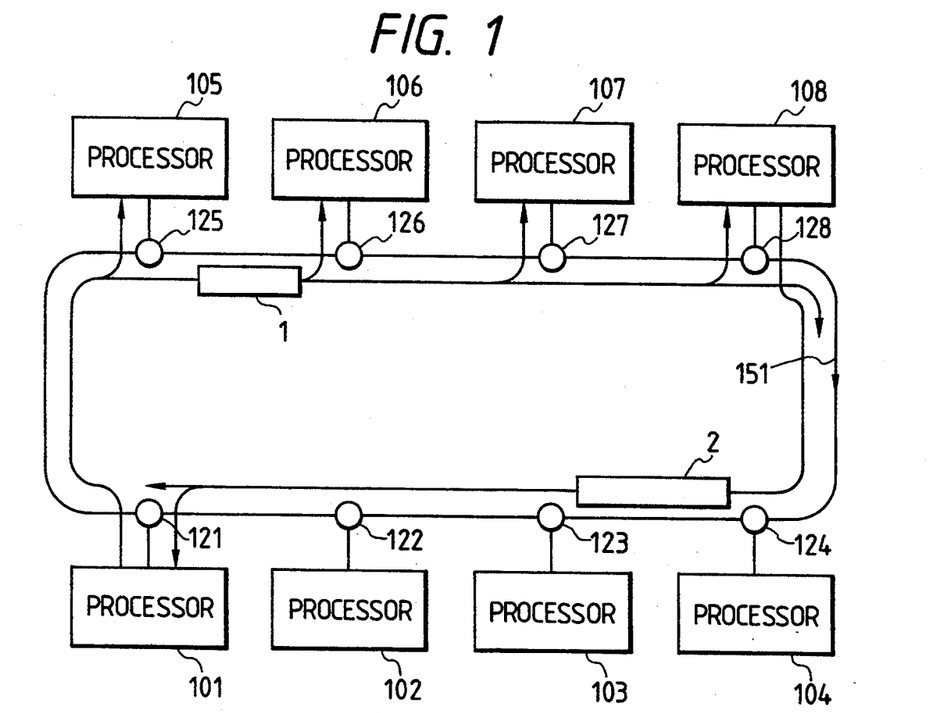
FIG. 1 is a general explanatory diagram of the present invention.

FIG. 1 shows the flow of the processing of the whole system. Here, it is assumed that an abnormality has occurred in a program within the processor 101 and that a program which corresponds to the function of the abnormal program and which is in the course of an online operation exists within the processor 108. When the built-in tester 408 of the processor 101 has sensed the abnormality of the application program stored in the processor 101, a status message indicative of the status of the processor 101 is generated, and it is caused to flow from the processor 101 onto the transmission path 151 via the NCP 121. The broadcast status message 1 is accepted by the respective NCPs, and is sent to the corresponding processors. On the basis of the status message, the respective processors examine whether or not the program to be sent is existent among programs in the course of online operations. Since the program to be sent is existent within the processor 108 here, this processor 108 sends a message 2 to the transmission path 151, the message having a data portion whose format is shown in FIG. 4 and which contains the pertinent program as a part thereof. On the basis of the function code of the message, each of the NCPs judges whether or not the program having arrived is necessary for the corresponding processor connected therewith. Upon judging the necessity, the NCP accepts the message. Since the message 2 contains the program contains the program corresponding to the function of the program required by the processor 101, the NCP 121 delivers the message 2 to the processor 101. The processor 101 stores the program contained in the message 2 in the application program area of its own, and starts the execution thereof.

By the way, in a case where the processor having judged an overload causes a status message to flow and where the processor having accepted the message judges it from a load on its own process to send a status message, it is also possible that the latter processor sends the status message, whereupon among the processors having received this message, the processor of the overload sends a program.

Figure 10A:
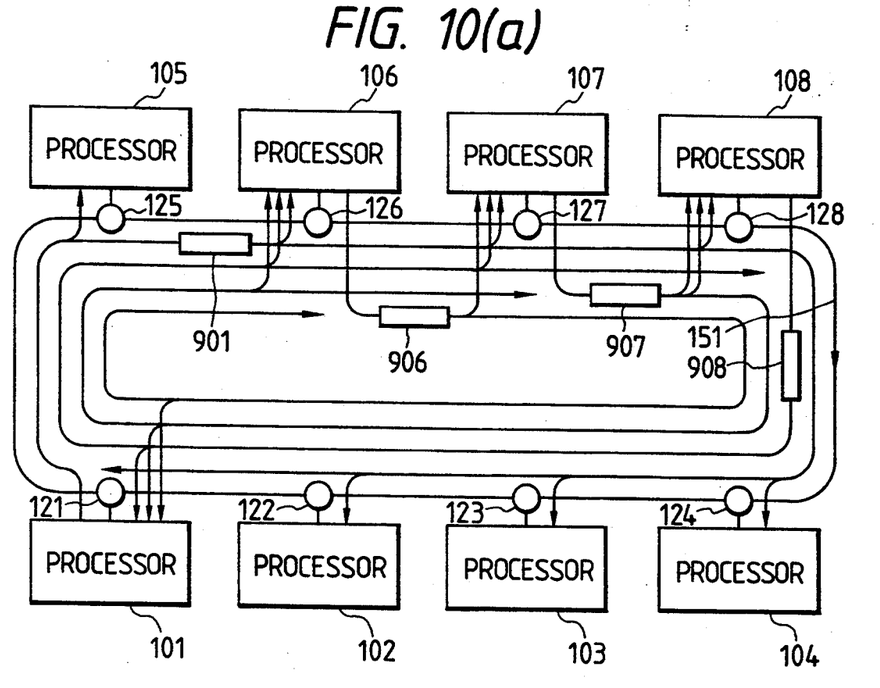
FIGS. 10(a)-10(c) are flow charts showing the processing flows of the whole system in the cases where loads are too heavy and too light.
Figure 10B:
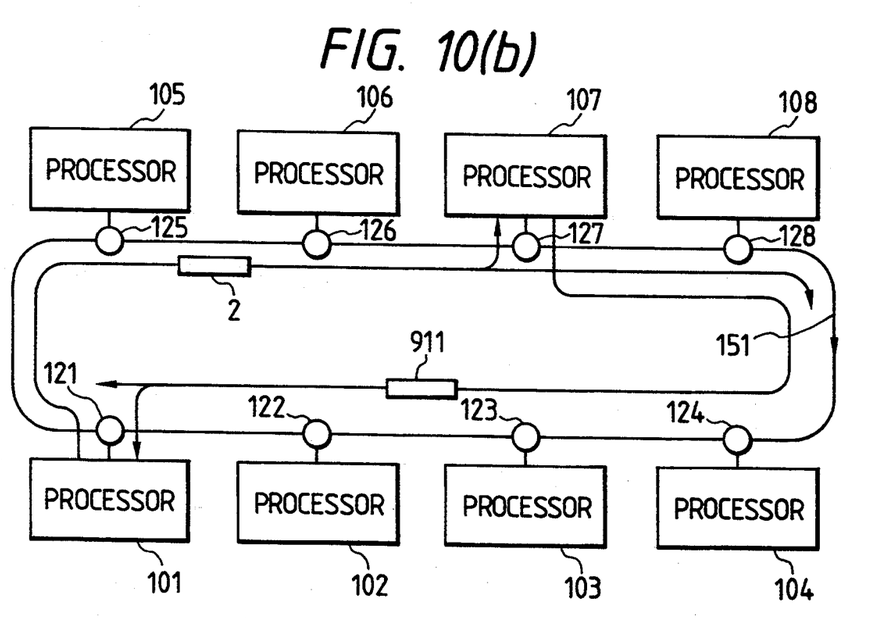
Figure 10C:
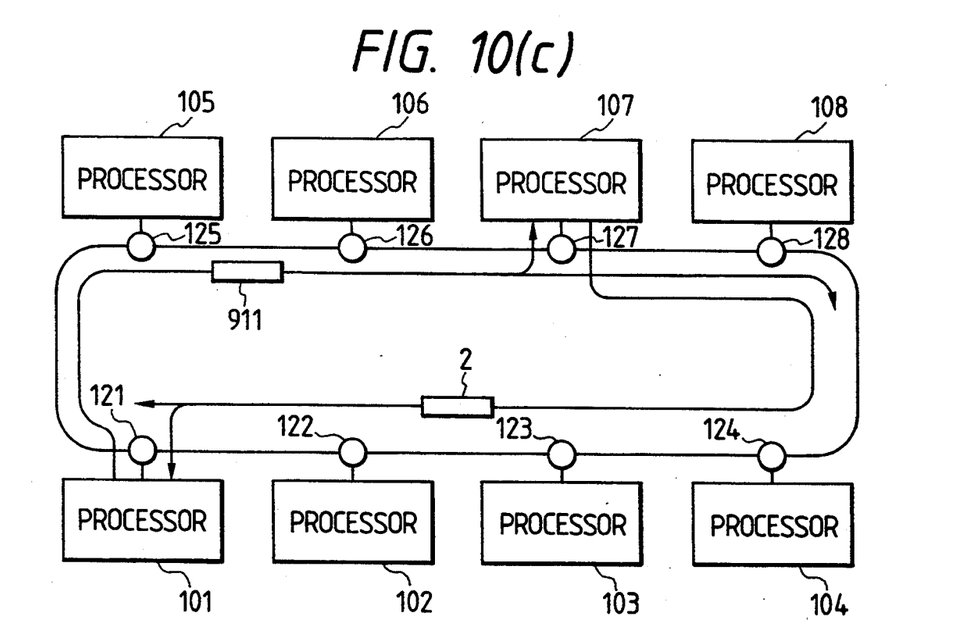
Figure 11A:
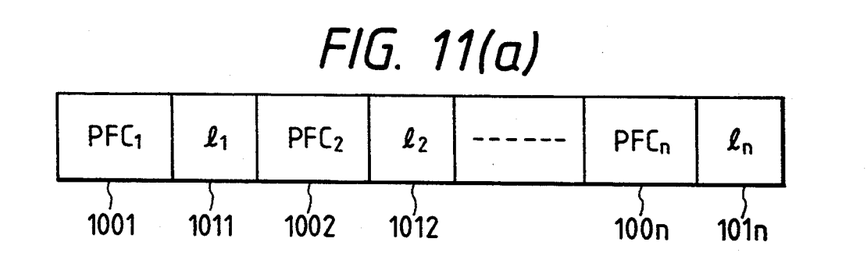
FIGS. 11(a) and 11(b) are format diagrams of status messages.

FIGS. 10(a)–10(c) show the flows of the processing of the whole system in the cases where loads are too heavy and too light. First, it is assumed that the built-in tester of the processor 101 has sensed the overload of the process of its own processor (any of cases where the number of times which data items required for the process of the own processor are accepted from the transmission path 151 within a fixed time interval is larger than a specified reference, where the number of those steps of a program which are processed within a fixed time interval is larger than a specified reference, etc.). Then, the processor 101 causes a status message 901 to flow through the transmission path 151. The format of the status message 901 is shown in FIG. 11(a). The contents of the status message 901 are the program function codes 1001–100n of all the programs within the processor 101, and the load indices of the respective programs (the numbers of steps within a fixed time interval as developed by the corresponding programs) $l_1$–$l_n$ (1011–101n). The m-th processor 10m (m=2, 3, .., 8) having received the status message 901 judges whether or not the status message contains the load index $l_i$ according to which the sum $L_m$ of the load indices of all the programs within the own processor satisfies the following inequality:

$$L_1 - l_i \geq L_m + l_i (i=1, 2, \ldots n) \tag{1}$$

Figure 11B:
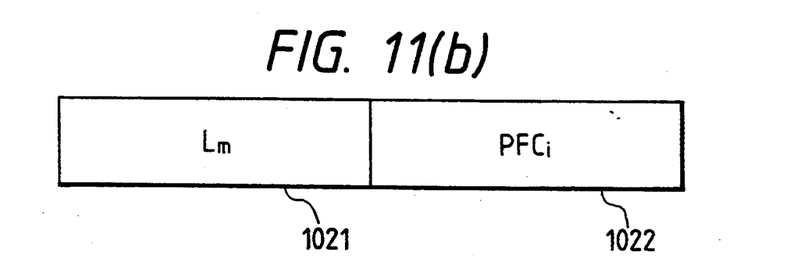

Incidentally, in a case where a plurality of indices $l_i$ satisfying In. (1) are existent, the index $l_i$ with which the difference between the left-hand side and right-hand side of In. (1) is minimized is selected from among the plurality of indices. It is assumed here that the processors 106–108 have judged the index $l_1$ as meeting In. (1) and meeting the aforementioned condition. On this occasion, the respective processors 106–108 cause status messages 906–908 to flow. The format of each of the status messages 906–908 is as shown in FIG. 11(b), and it is made up of the sum $L_m$ 1021 of the load indices of all the programs within the corresponding processor and a program function code $PFC_i$ 1022 corresponding to the load index $l_i$ meeting In. (1). The processors 101 and 106–108 accept the status messages 906–908 within a fixed time interval, and they compare the sums $L_m$ of the status messages containing the same program function code as their contents, so as to judge the message whose sum $L_m$ is the smallest. It is assumed here that the sum of the load indices of all the programs within the processor 107 has been judged to be the smallest among the sums within the processors 106–108. The subsequent flow of the processing of the whole system is shown in FIG. 10(b). The processor 107 causes a status message 911 to flow through the transmission path 151. The content of the status message 911 is the program function code $PFC_i$ 1022 within the status message 907. The processor 101 having received the status message 911 causes the program 2 to flow onto the transmission path 151, this program corresponding to the content of the pertinent message.

The case where the built-in tester of the processor 101 has sensed the underload of the process of the own processor, will be described with reference to FIG. 10(a). The processor 101 causes a status message 901 to flow. The m-th processor 10m having received the status message 901 judges as to the load indices $l_1'$–$l_n'$ of the respective programs within its own, whether or not the load index $l_i'$ exists which satisfies the following inequality:

$$L_1 + l_i \geq L_n - l_i' (i=1, 2, \ldots n) \tag{2}$$

Incidentally, in a case where a plurality of indices $l_i'$ satisfying In. (2) are existent, the index $l_i$ with which the difference between the left-hand side and right-hand side of In. (2) is minimized is selected from among the plurality of indices. It is assumed here that the processors 106–108 have judged the existence of the index $l_i'$ meeting In. (2). On this occasion, the respective processors 106–108 cause status messages 906–908 to flow. The processors 101 and 106–108 accept the status messages 906–908 within a fixed time interval, and they compare the sums $L_m$ of the status messages so as to judge the message whose sum $L_m$ is the greatest. It is assumed here that the sum of the load indices of all the programs within the processor 107 has been judged to be the greatest among the sums within the processors 106–108. The subsequent flow of the processing of the whole system is shown in FIG. 10(c). The processor 101 causes a status message 911 to flow through the transmission path 151. The content of the status message 911 is the program function code PFC 1022 within the status message 907. The processor 107 having received the status message 911 causes the program 2 to flow onto the transmission path 151, this program corresponding to the content of the pertinent message.

By the way, the status messages 1, 901, 907–909 and 911 shall have the respectively different function codes, and the steps shown in FIG. 8 are the processing steps of the processor having received the status message 1 or 911.

In addition, as regards the status messages 901 and 907–909, the separate function codes shall be possessed for the overload and the underload.

According to this embodiment, each of the processors monitors the statuses of the programs within its own and can send the status message upon peculiarly judging from the status; the processor having received the status message can send the program upon peculiarly judging from the content of the message, if the program within the own processor is to be sent and which of the programs is to be sent; and each of the processors can judge whether or not the program flowing through the transmission path is necessary for the process of the own processor, and if necessary, it can load and execute the program; so that each of the processors is permitted to peculiarly cope with situations where any abnormality of the program has occurred and where the load of the processor is too heavy or too light.

As stated above, according to the present invention, in a distributed system wherein a plurality of processors are connected through a network and wherein programs can be transmitted among the processors under an online environment, each of the processors can judge the program which needs to be loaded from the network, and it can load at the time of the judgement the program which corresponds to the function of the needed program. This brings forth the effect that each of the processors can peculiarly cope with the occurrence of the abnormality of a program, an overload and underload on the process of the own processor, etc.

What is claimed is:

1. A method for transmitting a program in a distributed processing system wherein a plurality of processors are connected through a network, said method comprising the steps of:

monitoring, in each processor, a first execution status of a program related to a respective processor, being executed in said processor;

broadcasting a first message containing said first execution status from said respective processor to said network, when said first execution status satisfies a condition indicating a necessity of sending said first execution status;

receiving, in each of said processors except said respective processor, said first message from said respective processor;

judging in each of the receiving processors, in response to the received first message, based on said first execution status, whether there is a second execution status indicating necessity of sending or receiving a program needed by at least one of the other processors;

broadcasting from at least one of the receiving processors to said network a second message containing said second execution status, when said second execution status is judged as existing;

receiving, in at least each of said respective processor and other second message broadcasting processors said second message;

deciding, in each processor receiving said second message, based upon the received second execution status, whether to send or to receive a needed program; and conducting, in each of the second message receiving processors, sending or receiving of the needed program based on a result of said deciding step.

2. A method for transmitting a program as defined in claim 1, wherein said first execution status indicates an occurrence of an abnormal condition during execution of said program.

3. A method for transmitting a program as defined in claim 1, wherein said first execution status indicates an occurrence of an overload or underload condition of said respective processor during execution of said program.

4. A method for transmitting a program as defined in claim 3, wherein said overload or underload condition is judged from a load index of said respective processor.

5. A method for transmitting a program as defined in claim 1, wherein said program judged to be sent to or received from the judging processor is broadcast to said network, from another processor, when a load index in said another processor, obtained by estimating an amount of load after removing the broadcast program from said another processor, is greater than a load index obtained by estimating the amount of load after adding said broadcast program to said judging processor.

6. A method for transmitting a program according to claim 1, wherein the judging step responds to a function code in said first message.

7. A method for transmitting a program as defined in claim 6, wherein said program judged to be sent or received from the judging processor is broadcast to said network when a load index in another processor obtained by estimating an amount of load after adding the broadcast program to said another processor, is smaller than a load index, obtained by estimating the amount of load after removing said broadcast program from said judging processor.

8. A system for transmitting a program in a distributed processing system, comprising:

a plurality of processors connected through a network;

means for monitoring, in each processor, a first execution status of a program related to the respective processor being executed in said respective processor;

means for broadcasting a message from said respective processor to said network, when said first execution status satisfies a condition indicating necessity of sending said first execution status;

means for receiving, in each of said monitoring processors except said respective processor, said first message from said respective processor;

means in each of the receiving processors, in response to the received first message, based on said first execution status, for judging whether there is a second execution status indicating the necessity of sending or receiving a program needed in at least one of the other processors;

means for broadcasting, from at least one of the receiving processors to said network, a second message containing said second execution status, when said second execution status is judged as existing;

means for receiving, in at least each of said respective and other second message broadcasting processors, said second message;

means for deciding, in each processor receiving said second message, based upon the received second execution status, whether to send or receive a needed program; and means for transferring or receiving the needed program to or from each of the second message receiving processors as decided in ther deciding means.

9. A system for transmitting a program according to claim 8 wherein the judging operation of the judging means responds to a function code in said first message.

* * * * *